United States Patent
Cross

(10) Patent No.: US 9,442,600 B2
(45) Date of Patent: Sep. 13, 2016

(54) TOUCH SENSITIVE PROJECTION SCREEN

(75) Inventor: Elisa M. Cross, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 932 days.

(21) Appl. No.: 11/311,082

(22) Filed: Dec. 19, 2005

(65) Prior Publication Data

US 2007/0139397 A1    Jun. 21, 2007

(51) Int. Cl.
*G06F 3/042* (2006.01)

(52) U.S. Cl.
CPC .................................... *G06F 3/042* (2013.01)

(58) Field of Classification Search
USPC ................................................. 345/173–178
See application file for complete search history.

(56) References Cited

U.S. PATENT DOCUMENTS

| | | |
|---|---|---|
| 3,707,416 A | 12/1972 | Stevens |
| 3,806,642 A | 4/1974 | Veith et al. |
| 3,919,559 A | 11/1975 | Stevens |
| 4,293,734 A | 10/1981 | Pepper et al. |
| 4,353,552 A | 10/1982 | Pepper, Jr. |
| 4,371,746 A | 2/1983 | Pepper, Jr. |
| 4,622,437 A | 11/1986 | Bloom et al. |
| 4,731,508 A | 3/1988 | Gibson et al. |
| 4,797,514 A | 1/1989 | Talmage, Jr. et al. |
| 4,812,709 A | 3/1989 | Dudasik |
| 5,045,644 A | 9/1991 | Dunthorn |
| 5,159,159 A | 10/1992 | Asher |
| 5,254,388 A | 10/1993 | Melby et al. |
| 5,637,958 A * | 6/1997 | Levine .......................... 313/496 |
| 5,650,597 A | 7/1997 | Redmayne |
| 5,771,039 A * | 6/1998 | Ditzik .......................... 345/178 |
| 6,002,389 A | 12/1999 | Kasser |
| 6,398,370 B1 * | 6/2002 | Chiu et al. .................... 359/613 |
| 6,549,193 B1 | 4/2003 | Huang et al. |
| 6,593,916 B1 | 7/2003 | Aroyan |
| 6,818,828 B2 | 11/2004 | Quaggia |
| 6,825,833 B2 | 11/2004 | Mulligan et al. |
| 6,927,761 B2 | 8/2005 | Badaye et al. |
| 2001/0055153 A1 * | 12/2001 | Moshrefzadeh et al. ..... 359/490 |
| 2002/0149572 A1 | 10/2002 | Schulz et al. |
| 2004/0090429 A1 * | 5/2004 | Geaghan et al. ............. 345/173 |
| 2004/0130788 A1 | 7/2004 | Minami |
| 2005/0184969 A1 * | 8/2005 | Dunn et al. ................... 345/173 |
| 2005/0253307 A1 | 11/2005 | Sreenivasan |

FOREIGN PATENT DOCUMENTS

EP         1-172-831 A2    1/2002

* cited by examiner

*Primary Examiner* — Long D Pham
(74) *Attorney, Agent, or Firm* — Robert S. Moshrefzadeh

(57) ABSTRACT

An optical device and a projection system incorporating same is disclosed. The optical device includes a light management element. The light management element includes an electrically conductive light absorber that is disposed in a display area for controlling a viewing angle of light transmitted through the display area. The conductive light absorber is configured to generate a signal in response to a touch in the display area. The signal is capable of being used to determine information related to the touch.

10 Claims, 4 Drawing Sheets

TOUCH SENSITIVE PROJECTION SCREEN

FIELD OF THE INVENTION

This disclosure generally relates to touch sensors, and is particularly applicable to touch sensitive projection screens.

BACKGROUND

Touch screens allow a user to conveniently interface with an electronic display system by reducing or eliminating the need for a keyboard. For example, a user can carry out a sequence of instructions by simply touching the screen at a location identified by a pre-programmed icon. As another example, a touch screen may allow a user to transfer text or drawing to an electronic display device by directly writing or drawing onto the touch screen.

Resistive and capacitive are two common touch sensing methods employed to detect the location of a touch input. Resistive technology typically incorporates two transparent conductive films as part of an electronic circuit that detects the location of a touch. Capacitive technology, on the other hand, commonly uses a single transparent conductive film to detect the location of an applied touch. The transparent conductive film is often deposited on an insulating substrate and is covered with a thin dielectric coating to protect the conductive film from damage.

A touch location is generally determined by applying an electric field to a resistive film in the touch sensitive area. For an electrically continuous resistive film, the accuracy of detecting the location of an applied touch often depends on the linearity of the electric field in the resistive film. The electric field linearity is usually improved by forming an electrode pattern around the touch sensitive area.

A projection screen is generally a sheet-like optical device placed at an image surface of a projector or a projection system. Such a screen is capable of making visible to a viewing space an image projected by the projector onto the image surface. A projection screen can be a front projection screen in which case the image projector and the viewing space are typically on the same side of the screen. In the case of a rear projection screen, on the other hand, the image projector and the viewing space are typically on opposite sides of the screen.

Typical screen characteristics used to describe a screen's performance include viewing angle and contrast. It is generally desirable to have a projection screen that has a high contrast and disperses or scatters light into a desired viewing space.

A light control film is generally an optically transmissive film that controls the direction of an incident light that is transmitted by the film. Light control films are generally placed near or mounted on a visual display monitor for the purpose of reducing glare, increasing contrast, or providing privacy.

SUMMARY OF THE INVENTION

Generally, the present invention relates to touch sensors. In one embodiment of the invention, an optical device includes a light management element. The light management element includes an electrically conductive light absorber disposed in a display area. The light absorber controls a viewing angle of light transmitted through the display area. The light absorber is configured to generate a signal in response to a touch in the display area. The signal is capable of being used to determine information related to the touch.

In another embodiment of the invention, an optical device includes a projection screen that is capable of displaying an image projected onto the screen. The screen has an electrically conductive light absorber. The optical device further includes an optically transmissive electrically conductive layer that faces the screen. The conductive light absorber is configured to generate a signal when an applied touch causes the conductive light absorber to make electrical contact with the optically transmissive electrically conductive layer. The generated signal is capable of being used to determine information related to the touch.

In another embodiment of the invention, a touch sensor includes one or more electrically conductive light absorbing elements that are disposed in an optically transmissive touch sensitive area. The light absorbing elements are configured to generate a signal in response to a touch applied to the touch sensitive area from a touch side of the touch sensor. The generated signal is capable of being used to determine information related to the touch.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

The present disclosure describes a touch sensor where the touch sensor is capable of controlling optical characteristics of light that is incident on and transmitted by the touch sensor. The characteristics include viewing angle of the transmitted light along one or more directions. The present invention further discloses a touch sensor that includes electrically conductive light absorbers for absorbing a substantial amount of ambient light that may be incident on the touch sensor from the touch side of the sensor. The electrically conductive light absorbers are an integral part of the touch sensing process and are capable of generating a touch signal in response to an applied touch implement where the touch signal can be used to determine information regarding the touch, such as the touch location and/or the force that may be applied to the sensor by the touch implement.

One advantage of the present invention is that a touch sensor combines the functions generally provided separately by a touch sensor and a light control film such as a privacy film. By combining the functions, the present invention can reduce cost and the overall size, such as the foot print size, of an optical system that employs the touch sensor.

In some applications, the light control film can function as a projection screen capable of displaying an image projected onto the touch sensor to a desired viewing space.

Figure 1:
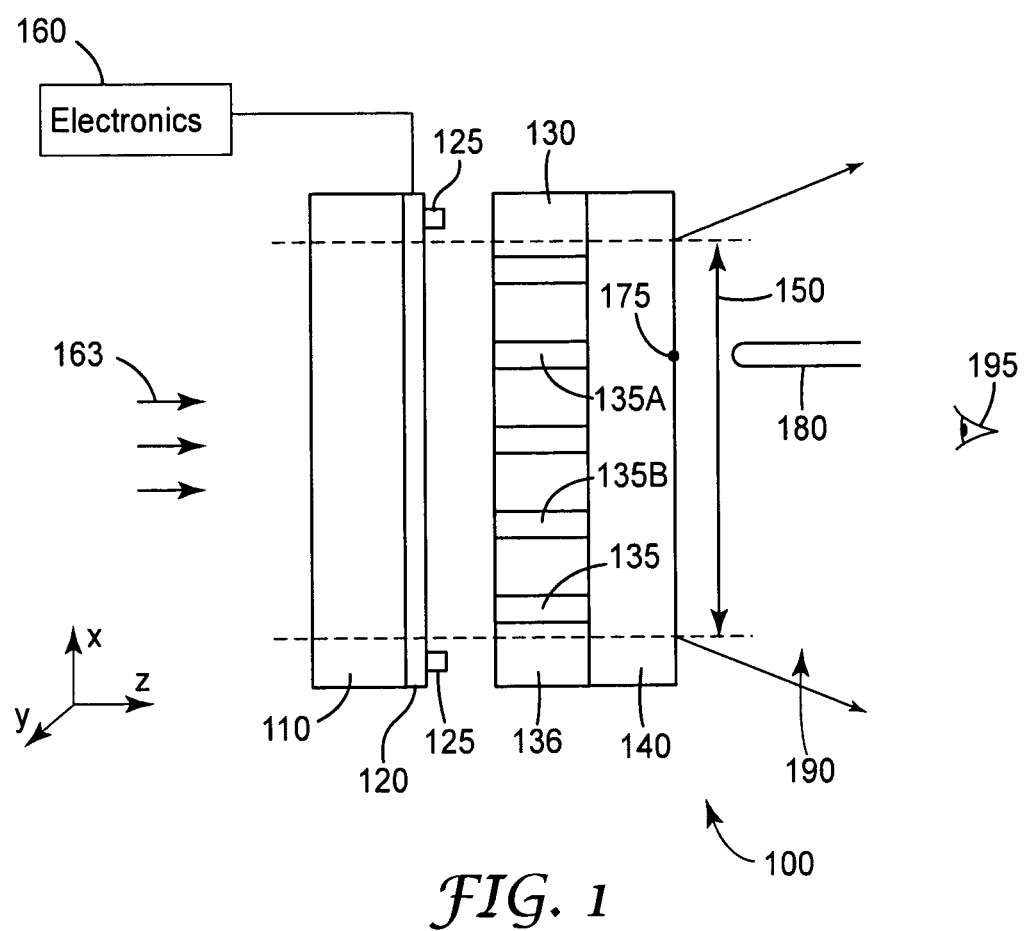
FIG. 1 illustrates a schematic side-view of a touch sensor in accordance with one embodiment of the invention.

FIG. 1 is a schematic side-view of a touch sensor 100 in accordance with one embodiment of the invention. Touch sensor 100 has a display area 150 and includes an optically transmissive electrically conductive layer 120 disposed on a substrate 110 and a light management element 130 disposed on a substrate 140. Display area 150 is touch sensitive, meaning that the touch sensor generates a signal, such as an electrical signal, in response to a touch applied to a location in the display area. In some applications, some portions of display area 150 are touch sensitive while other portions are not.

Light management element 130 includes a plurality of electrically conductive light absorbers 135, such as light absorbers 135A and 135B, disposed in a host medium 136. In the absence of a touch input with sufficient force, conductive light absorbers 135 do not make electrical contact with conductive layer 120. With sufficient force, a touch implement 180 applied to a location 175 in display area 150 causes one or more of the light absorbers, such as light absorber 135A, to make electrical contact with conductive layer 120. The electrical contact results in the generation of a signal that can be used by electronics 160 to determine information related to the touch, such as the location of the touch and/or the amount of force applied to the touch sensor by the touch implement.

Light management element 130 controls the viewing angle of incident light 163 that is transmitted by touch sensor 100 through display area 150. The viewing angle can be controlled along one or more directions, such as along the x-axis and/or the y-axis. For example, light management 130 can substantially limit the dispersion of light to a viewing space 190 that may include one or more viewers, such as viewer 195.

According to one embodiment of the invention, light management element 130 is a light control film where conductive light absorbers 135 form louvers in the light management element. According to another embodiment of the invention, light management element 130 is a light control film where conductive light absorbers 135 are formed by, for example, filling a plurality of grooves in host medium 136 with a light absorbing electrically conductive material. Some previously disclosed light control films are discussed, for example, in U.S. Pat. Nos. 3,707,416; 3,919,559; 5,254,388; 6,398,370; and U.S. Patent Application No. 2004/0130788.

Light absorbers 135 can be formed, for example, by dispersing a sufficient amount of a conductive pigment, such as conductive carbon black fillers, in a binder, or by using a light absorbing conductive material such as black nickel or black aluminum as disclosed, for example, in U.S. Pat. No. 6,818,828 and U.S. Patent Application No. 2005/0253307.

Touch sensor 100 further includes a linearization pattern 125 disposed on conductive layer 120 for enhancing touch accuracy by improving field linearity in display area 150. Linearization pattern 125 is typically disposed around the display area, although in some applications, at least a portion of the linearization pattern may be in the display area.

Linearization pattern 125 can be any pattern that can improve linearity in display area 150, such as those disclosed in U.S. Pat. Nos. 4,293,734; 4,353,552; 4,371,746; 4,622,437; 4,731,508; 4,797,514; 5,045,644; 6,549,193; and 6,593,916.

Conductive layer 120 can be an electrically continuous layer covering display area 150. In some applications, conductive layer 120 can be discontinuous. For example, conductive layer 120 can include a plurality of rows or columns of conductive bars discussed, for example, in U.S. Pat. Nos. 5,159,159; 5,650,597; 6,002,389; and 6,825,833. As another example, conductive layer 120 can include a plurality of discrete segments located at various positions in display area 150, where each segment can correspond, for example, to a displayed icon.

Conductive layer 120 can be a metal, semiconductor, doped semiconductor, semi-metal, metal oxide, an organic conductor, a conductive polymer, and the like. Exemplary metal conductors include gold, copper, silver, and the like. Exemplary inorganic materials include transparent conductive oxides, for example indium tin oxide (ITO), fluorine doped tin oxide, tin antimony oxide (TAO), and the like. Exemplary organic materials include conductive polymers such as polypyrrole, polyaniline, polyacetylene, and polythiophene, such as those disclosed in European Patent Publication EP-1-172-831-A2. The sheet resistance of conductive layer 120 can be in a range from about 50 to 100,000 Ohms/square. The sheet resistance of the conductive layer 120 is preferably in a range from about 100 to 50,000 Ohms/square, more preferably in a range from about 200 to 10,000 Ohms/Square, and even more preferably in a range from about 500 to 4,000 Ohms/Square.

The exemplary touch sensor 100 shown in FIG. 1 is a resistive touch sensor employing a resistive technology to detect the location of an applied touch. In general, touch sensor 100 can use other technologies to detect the touch location. Exemplary technologies include capacitive disclosed, for example, in U.S. Patent Application No. 2002/0149572; near field imaging disclosed, for example, in U.S. Pat. No. 6,927,761; and piezoelectric disclosed, for example, in U.S. Pat. No. 3,806,642.

Figure 2:
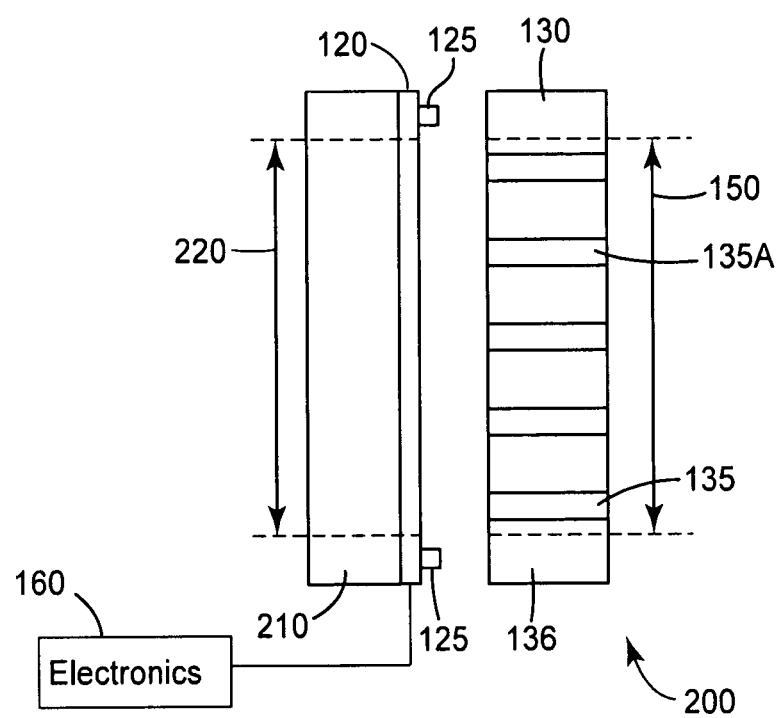
FIG. 2 illustrates a schematic side-view of an optical system in accordance with another embodiment of the invention.

FIG. 2 illustrates a schematic side-view of an optical system 200 in accordance with one embodiment of the invention. Optical system 200 includes a display element 210 that is capable of displaying information in a display region 220 of the display element. Optical system 200 further includes light management element 130 disposed in display region 220, meaning that touch sensitive display area 150 is placed proximate display region 220 so that display element 210 is viewable through light management element 130.

Optical system 200 further includes optically transmissive electrically conductive layer 120 optionally disposed on display element 210. According to one embodiment of the invention, a signal is generated when a conductive light absorber, such as light absorber 135A, makes electrical contact with conductive layer 120 in response to a touch applied to light management element 130 in display area 150.

Display element 210 can include permanent or replaceable graphics (for example, pictures, maps, icons, and the like) as well as electronic displays such as liquid crystal displays (LCD), cathode ray tubes (CRT), plasma displays, electroluminescent displays, OLEDs, electrophoretic displays, and the like.

Figure 3:
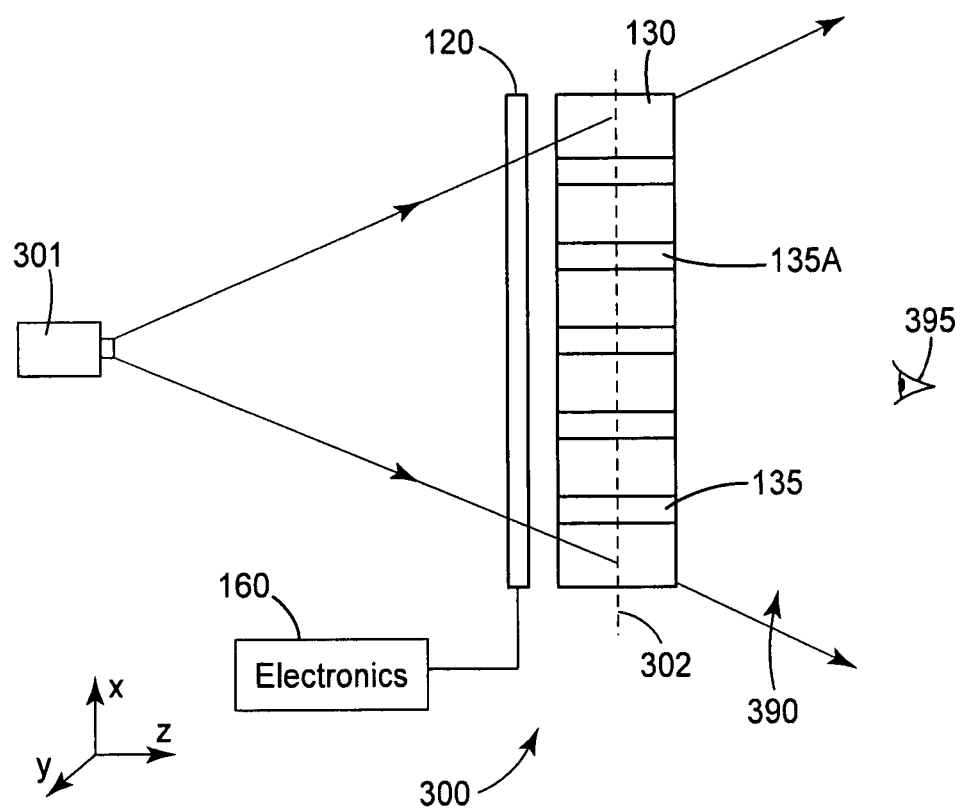
FIG. 3 illustrates a schematic side-view of a projection system in accordance with another embodiment of the invention.

FIG. 3 illustrates a schematic side-view of a projection system 300 in accordance with one embodiment of the invention. Projection system 300 includes a projector 301 that is capable of projecting an image onto an image surface 302 where the surface can be a plane. Projection system 300 further includes light management element 130 disposed at or near image surface 302. Projection system 300 may further include optional conductive layer 120, in which case, a signal is generated when a conductive light absorber, such as light absorber 135A, makes electrical contact with conductive layer 120 in response to a touch applied to light management element 130.

According to one embodiment of the invention, light management element 130 is optically diffusive, for example, in regions between light absorbers 135. The regions can be made optically diffusive by, for example, dispersing small particles in a host material where the index of refraction of the particles is different than the index of refraction of the host material. An optically diffusive light management element 130 can scatter or otherwise disperse an image projected by projector 301 into a pre-determined viewing space 390 that may include one or more viewers, such as viewer 395. According to one embodiment of the invention, an optically diffusive light management element 130 scatters light asymmetrically, meaning that, for example, light is scattered along the x-axis differently than along the y-axis.

Figure 4:
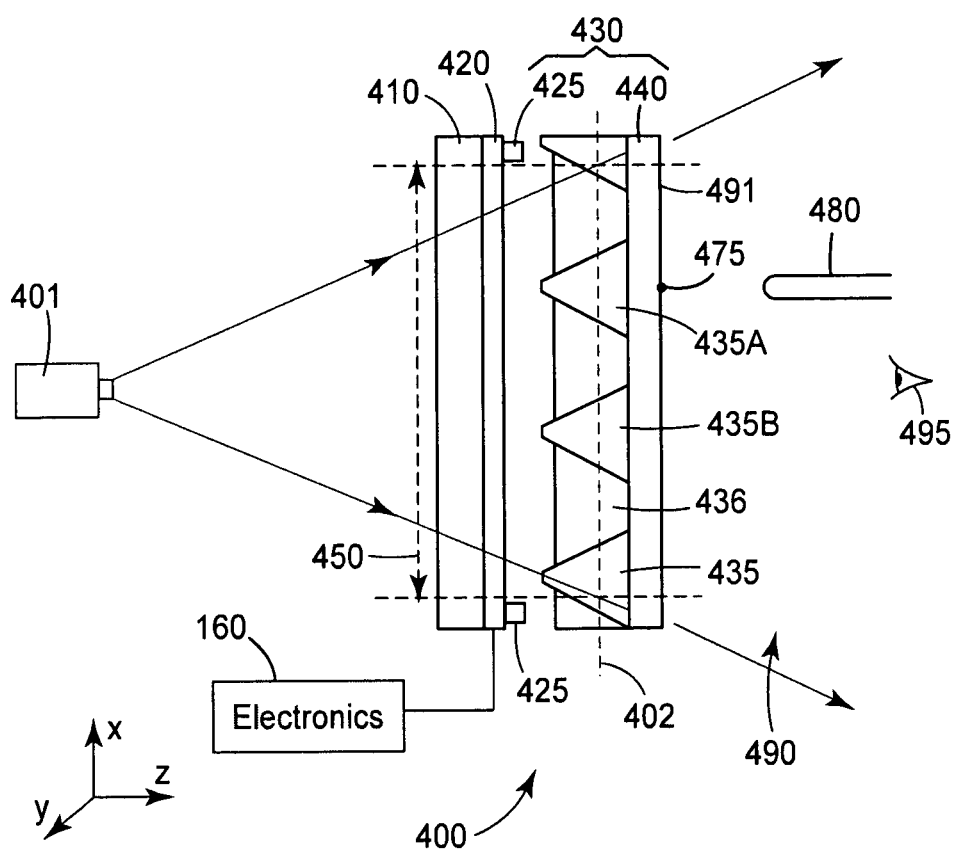
FIG. 4 illustrates a schematic side-view of a projection system in accordance with yet another embodiment of the invention.

FIG. 4 illustrates a schematic side-view of a projection system 400 in accordance with one embodiment of the invention. Projection system 400 includes a projector 401 that is capable of projecting an image onto an image plane 402. Projection system 400 further includes a projection screen 430 disposed at or near the image plane that is capable of displaying an image projected onto the image plane by the projector. Screen 430 has electrically conductive light absorbers 435 disposed on a substrate 440 where light absorbers 435 may include discrete conductive light absorbers such as light absorbers 435A and 435B. Screen 430 is designed so that light absorbers 435 absorb no or a small fraction of light projected onto the screen by projector 401. Screen 430 is further designed so that light absorbers 435 absorb a substantial fraction of ambient light that may be incident onto the screen from a viewing side 491 which can also be a touch side. Therefore, screen 430 displays a projected image having high brightness by transmitting a substantial fraction of light projected onto the screen by projector 401. The screen further displays a projected image having high contrast by absorbing a substantial fraction of incident ambient light.

The regions between light absorbers 435 may be filled with a host medium 436 where the medium can be optically diffusive.

Screen 430 makes an image projected by projector 401 viewable in a viewing space 490 that may include one or more viewers, such as viewer 495. According to one embodiment of the invention, screen 430 has asymmetric viewing angles. For example, the screen may have different viewing angles along the x- and y-axes.

Projection system 400 further includes an optically transmissive electrically conductive layer 420 disposed on a substrate 410 and a linearization pattern 425 disposed on conductive layer 420 around a screen display area 450. According to one embodiment of the invention, a touch applied by a touch implement 480 to a location 475 in display area 450 causes a light absorber, such as light absorber 435A, to make electrical contact with conductive layer 420. The electrical contact results in the generation of a signal, such as an electrical signal, where the signal is received an processed by electronics 160 to determine information related to the touch, such as the touch location and/or the amount of force applied to the screen by the touch implement.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical device comprising a light management element disposed in a display area for controlling a viewing angle of light transmitted through the display area, the light management element comprising a medium comprising a plurality of grooves, the grooves being uniformly filled with a light absorbing electrically conductive material uniformly light absorbing and electrically conductive throughout the material, the filled grooves configured to generate a signal in response to a touch in the display area, the signal capable of being used to determine information related to the touch.

2. The optical device of claim 1, wherein the light management element is optically diffusive.

3. The optical device of claim 2, wherein the light management element comprises particles having a first index dispersed in a host material having a second index different than the first index.

4. The optical device of claim 1, wherein the light management element is capable of displaying an image projected onto the light management element.

5. The optical device of claim 1, wherein the signal is capable of being used to determine the touch location.

6. The optical device of claim 1 further comprising an optically transmissive electrically conductive layer disposed in the display area, wherein the signal is generated when the conductive light absorber makes an electrical contact with the optically transmissive electrically conductive layer in response to the touch.

7. A projection system comprising the optical device of claim 6.

8. A projection screen comprising the optical device of claim 1.

9. A projection system comprising a projector capable of projecting an image onto an image plane; and the optical device of claim 1 disposed in the image plane.

10. An optical system comprising a display element capable of displaying information in a display region of the display element; and the optical device of claim 1 disposed in the display region.

* * * * *